US010939035B2

(12) United States Patent
Ji

(10) Patent No.: US 10,939,035 B2
(45) Date of Patent: Mar. 2, 2021

(54) PHOTOGRAPH-CAPTURE METHOD, APPARATUS, TERMINAL, AND STORAGE MEDIUM

(71) Applicant: ZTE CORPORATION, Guangdong (CN)

(72) Inventor: Dewei Ji, Shenzhen (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/467,932

(22) PCT Filed: Jun. 29, 2017

(86) PCT No.: PCT/CN2017/090945
§ 371 (c)(1),
(2) Date: Jun. 7, 2019

(87) PCT Pub. No.: WO2018/103314
PCT Pub. Date: Jun. 14, 2018

(65) Prior Publication Data
US 2020/0077017 A1 Mar. 5, 2020

(30) Foreign Application Priority Data
Dec. 7, 2016 (CN) .......................... 201611117141.7

(51) Int. Cl.
*H04N 5/232* (2006.01)
*G06T 7/00* (2017.01)

(52) U.S. Cl.
CPC ....... *H04N 5/23222* (2013.01); *G06T 7/0002* (2013.01); *G06T 2207/20021* (2013.01); *G06T 2207/30168* (2013.01)

(58) Field of Classification Search
CPC .................................................. H04N 5/23222
(Continued)

(56) References Cited

U.S. PATENT DOCUMENTS

2003/0112361 A1\* 6/2003 Cooper .............. H04N 5/23293
348/364
2003/0151674 A1\* 8/2003 Lin ........................ H04N 5/217
348/222.1
(Continued)

FOREIGN PATENT DOCUMENTS

| CN | 104780308 A | 7/2015 |
|---|---|---|
| CN | 105391942 A | 3/2016 |

(Continued)

OTHER PUBLICATIONS

International Search Report of PCT Application No. PCT/CN2017/090945, which is parent—4 pages (dated Sep. 27, 2017).
(Continued)

*Primary Examiner* — Joel W Fosselman
(74) *Attorney, Agent, or Firm* — Knobbe, Martens, Olson & Bear LLP

(57) ABSTRACT

Disclosed is a photograph-capture method. The method includes: obtaining an image for an image capture area, and obtaining an image quality assessment value of the image, where the image quality assessment value is configured to characterize a quality of the image; and when the image quality assessment value is determined to satisfy a preset quality condition, generating a photograph-capture instruction, executing the photograph-capture instruction, taking the image as a target image, and saving the target image. Also disclosed are a photograph-capture apparatus and a terminal.

14 Claims, 7 Drawing Sheets

(58) Field of Classification Search
USPC .................................................... 348/222.1
See application file for complete search history.

(56) References Cited

U.S. PATENT DOCUMENTS

| | | |
|---|---|---|
| 2004/0252217 A1 | 12/2004 | Battles et al. |
| 2005/0212955 A1 | 9/2005 | Craig et al. |
| 2008/0192129 A1 | 8/2008 | Walker et al. |
| 2010/0123805 A1 | 5/2010 | Craig et al. |
| 2011/0128414 A1 | 6/2011 | Walker et al. |
| 2012/0242844 A1 | 9/2012 | Walker et al. |
| 2013/0057713 A1 | 7/2013 | Khawand |
| 2013/0314511 A1 | 11/2013 | Chen et al. |
| 2013/0314558 A1 | 11/2013 | Ju et al. |
| 2013/0314580 A1 | 11/2013 | Ju et al. |
| 2013/0315499 A1 | 11/2013 | Ju et al. |
| 2013/0315556 A1 | 11/2013 | Ju et al. |
| 2015/0116548 A1 | 4/2015 | Bovik et al. |
| 2015/0146026 A1 | 5/2015 | Walker et al. |
| 2015/0243041 A1 | 8/2015 | Panetta et al. |
| 2017/0034448 A1 | 2/2017 | Ju et al. |

FOREIGN PATENT DOCUMENTS

| | | |
|---|---|---|
| CN | 105430287 A | 3/2016 |
| CN | 105959537 A | 9/2016 |
| KR | 20150041279 A | 4/2015 |
| WO | 2016/009199 A2 | 1/2016 |

OTHER PUBLICATIONS

Extended European Search Report of corresponding Patent Application No. 17879478—37 pages (dated May 14, 2020).

* cited by examiner

PHOTOGRAPH-CAPTURE METHOD, APPARATUS, TERMINAL, AND STORAGE MEDIUM

CROSS-REFERENCE TO RELATED APPLICATIONS

This is a National Stage Application, filed under 35 U.S.C. 371, of International Patent Application No. PCT/CN2017/090945, filed on Jun. 29, 2017, which claims priority to Chinese patent application No. 201611117141.7 filed on Dec. 7, 2016, contents of both of which are incorporated herein by reference in their entireties.

TECHNICAL FIELD

The present disclosure relates to the field of terminal application and, in particular, to a photograph-capture method and apparatus, a terminal, and a storage medium.

BACKGROUND

With the rapid development of image technology in the field of mobile intelligent terminals, mobile intelligent terminals have gradually replaced card-type cameras, becoming an important tool for people to take pictures and videos in their daily lives. At the same time, with the continuous improvement of users' professional quality, the image quality requirements for mobile terminals of users are also getting higher and higher. Therefore, taking good photos conveniently is becoming a goal pursued by mobile terminal manufacturers.

When a user takes pictures using a mobile terminal, if the user holds up the mobile terminal in the hand and presses the shutter to capture wonderful scenery, this wonderful scenery often passes quickly and is difficult to capture; or the captured image does not have optimal quality.

SUMMARY

A photograph-capture method and apparatus, a terminal and a storage medium provided by embodiments of the present disclosure implement the effective capture of the target scene, thereby ensuring the quality of the image captured by the terminal.

In one aspect, the embodiments of the present disclosure provide a photograph-capture method.

The method includes:
  obtaining an image for an image capture area, and obtaining an image quality assessment value of the image, where the image quality assessment value is configured to characterize a quality of the image; and
  if the image quality assessment value satisfies a preset quality condition, generating a photograph-capture instruction, executing the photograph-capture instruction, and saving the image as a target image.

In an embodiment, the step of obtaining the image quality assessment value of the image includes:
  obtaining a parameter value of an attribute parameter of the image, and determining the image quality assessment value of the image according to the parameter value of the attribute parameter.
  The attribute parameter includes at least one attribute parameter of a group consisting of: sharpness, contrast, saturation, luminance and noise.

In an embodiment, the step of determining the image quality assessment value of the image according to the parameter value of the attribute parameter includes:
  dividing the image into at least two image blocks according to a preset partitioning strategy;
  calculating a parameter value of an attribute parameter of each of the at least two image blocks;
  determining the parameter value of the attribute parameter of the each of the at least one image according to the parameter values of the at least one attribute parameter of the at least two image blocks; and
  determining the assessment value of the attribute parameter according to the parameter value of the attribute parameter of the at least one image, and determining the image quality assessment value of each of the at least one image according to the assessment value of the attribute parameter.

In an embodiment, the method further includes: comparing the image quality assessment value of the image with a preset assessment value threshold; and
  if the image quality assessment value of the image is greater than the preset assessment value threshold, determining that the image quality assessment value of the image satisfies the preset quality condition.

In an embodiment, the method further includes: if the image quality assessment value of the image fails to satisfy the preset quality condition, adjusting the image quality assessment value of the image according to the parameter value of the attribute parameter.

In an embodiment, when the attribute parameter includes at least two attribute parameters of a group consisting of: sharpness, sharpness, contrast, saturation, luminance and noise, the step of adjusting the image quality assessment value of the image according to the parameter value of the attribute parameter includes:
  determining an assessment value corresponding to a parameter value of each of the at least two attribute parameters, sorting the at least two attribute parameters according to the assessment value, and obtaining a sorting result; and
  adjusting the parameter value of the each of the at least two attribute parameters according to the sorting result to adjust the image quality assessment value of the image.

In one aspect, the embodiments of the present disclosure further provide a photograph-capture method. The method includes:
  obtaining at least one image captured for the same image capture area;
  obtaining an image quality assessment value of each of the at least one image, where the image quality assessment value is configured to characterize a quality of the each of the at least one image;
  determining an image with an image quality assessment value satisfying a preset quality condition in the at least one image as a target image, and generating a photograph-capture instruction; and
  executing the photograph-capture instruction, and saving the target image.

In an embodiment, the step of obtaining the image quality assessment value of the each of the at least one image includes: obtaining a parameter value of at least one attribute parameter of the each of the at least one image; and
  calculating an image quality assessment value of the each of the at least one image according to the parameter value of the at least one attribute parameter of the each of the at least one image in accordance with a preset rule.

In an embodiment, the step of calculating the image quality assessment value of the each of the at least one image according to the parameter value of the at least one attribute parameter of the each of the at least one image includes:

dividing the each of the at least one image into at least two image blocks according to a preset partitioning strategy;

calculating a parameter value of at least one attribute parameter of each of the at least two image blocks;

determining the parameter value of the attribute parameter of the each of the at least one image according to the parameter values of the at least one attribute parameter of the at least two image blocks; and determining the assessment value of the attribute parameter according to the parameter value of the attribute parameter of the at least one image, and determining the image quality assessment value of each of the at least one image according to the assessment value of the attribute parameter.

In an embodiment, the method further includes:

comparing the image quality assessment value of the each of the at least one image with a preset assessment value threshold; and determining an image with an image quality assessment value greater than the preset assessment value threshold as an image satisfying the preset quality condition.

In an embodiment, the method further includes: if the image quality assessment value of the each of the at least one image fails to satisfy the preset quality condition, taking an image with a maximum image quality assessment value in the at least one image as an adjustment target image; and adjusting a quality assessment value of the adjustment target image according to a parameter value of at least one attribute parameter of the adjustment target image.

In an embodiment, the step of adjusting the quality assessment value of the adjustment target image according to the parameter value of the at least one attribute parameter of the adjustment target image includes: obtaining the parameter value of the at least one attribute parameter of the adjustment target image;

determining an assessment value corresponding to each of the parameter values of the at least one attribute parameter, and taking an attribute parameter with an assessment value less than an attribute parameter of a first preset threshold as a first target attribute parameter; and adjusting a parameter value of the first target attribute parameter until the assessment value of the first target attribute parameter is greater than or equal to the first preset threshold.

In an embodiment, the step of adjusting the quality assessment value of the adjustment target image includes:

obtaining the parameter value of the at least one attribute parameter of the adjustment target image;

determining an assessment value corresponding to each of the parameter value of the at least one attribute parameter, and taking a plurality of attribute parameters with assessment values less than a second preset threshold as second target attribute parameters;

sorting the second target attribute parameters according to the assessment value; and adjusting the parameter values of the sorted second target attribute parameters sequentially until the image quality assessment value of the adjustment target image is greater than or equal to the preset assessment value threshold.

In an embodiment, the attribute parameter includes: sharpness, contrast, saturation, luminance and noise.

The embodiments of the present disclosure further provide a photograph-capture apparatus. The apparatus includes a capturing module, a processing module, a determining module and a saving module.

The capturing module is configured to obtain at least one image captured for the same image capture area.

The processing module is configured to obtain an image quality assessment value of each of the at least one image. The image quality assessment value is configured to characterize a quality of the each of the at least one image.

The determining module is configured to determine an image with an image quality assessment value satisfying a preset quality condition in the at least one image as a target image, and generate a photograph-capture instruction.

The saving module is configured to execute the photograph-capture instruction, and save the target image.

In an embodiment, the apparatus further includes an adjusting module. The adjusting module is configured to: if the image quality assessment value of the each of the at least one image fails to satisfy the preset quality condition, sort the at least one image according to the image quality assessment value, and take an image with a maximum image quality assessment value in the at least one image as an adjustment target image; and adjust a quality assessment value of the adjustment target image according to a parameter value of at least one attribute parameter of the adjustment target image.

The embodiments of the present disclosure further provide a terminal. The terminal includes an image sensor, a processor and a memory.

The image sensor is configured to obtain at least one image captured for the same image capture area.

The processor is configured to obtain an image quality assessment value of each of the at least one image, where the image quality assessment value is configured to characterize a quality of the each of the at least one image; determine an image with an image quality assessment value satisfying a preset quality condition in the at least one image as a target image, and generate a photograph-capture instruction; and execute the photograph-capture instruction, and save the target image in the memory.

The embodiments of the present disclosure further provide a storage medium. The storage medium includes a stored program which, when executed, executes the above photograph-capture method.

The photograph-capture method and apparatus, the terminal and the storage medium provided by the embodiments of the present disclosure obtain an image for an image capture area, and obtain an image quality assessment value of the image, where the image quality assessment value is configured to characterize a quality of the image; and when the image quality assessment value is determined to satisfy a preset quality condition, generate a photograph-capture instruction, execute the photograph-capture instruction, and save the image as a target image. Therefore, an image with an image quality assessment value satisfying the preset quality condition is taken as a result of the photograph-capturing. On the other hand, when the image for the image capture area includes multiple images, an image with an image quality assessment value satisfying the preset quality condition is taken as the result of the photograph-capturing, thereby implementing the effective capture of the target scene and ensuring the quality of the image captured by the terminal.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

The present disclosure will be described clearly and completely in conjunction with drawings in the embodiments of the present disclosure.

Embodiment 1

An embodiment of the present disclosure provides a photograph-capture method. The photograph-capture method in the embodiment of the present disclosure may be executed by a photograph-capture apparatus, and the photograph-capture apparatus may be disposed in or externally connected to a terminal. The terminal may be a mobile phone, a tablet PC, a digital camera, etc.

Figure 1A:
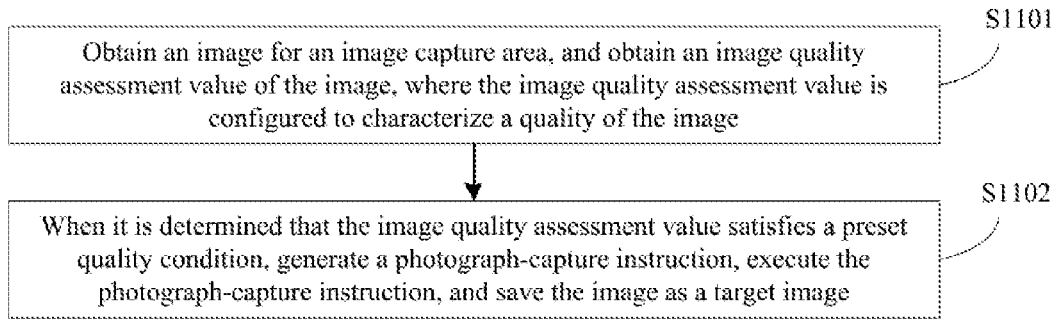
FIG. 1A is a flowchart of a photograph-capture method according to an embodiment 1 of the present disclosure.

FIG. 1A is a flowchart of a photograph-capture method according to an embodiment 1 of the present disclosure. Referring to FIG. 1A, the method includes steps described below.

In step S1101, an image for an image capture area is obtained, and an image quality assessment value of the image is obtained, where the image quality assessment value is configured to characterize a quality of the image.

A photograph-capture mode may be an automatic photograph-capture mode, or may be a manual photograph-capture mode. For the automatic photograph-capture mode, when receiving an automatic photograph-capture instruction, the terminal enters the automatic photograph-capture mode, and captures the image of the image capture area through a camera. The operation of triggering the automatic photograph-capture instruction or a manual photograph-capture instruction may be a voice operation, a click operation or a touch operation on a physical button or virtual button of the terminal to enter the corresponding photograph-capture mode.

When the image of the image capture area is captured, the image is analyzed to obtain the image quality assessment value of the image. The step in which the image quality assessment value of the image is obtained includes that a parameter value of an attribute parameter of the image is obtained, and the image quality assessment value of the image is determined according to the parameter value of the attribute parameter. The attribute parameter includes at least one of sharpness, contrast, saturation, luminance or noise.

The attribute parameter of the image may be obtained using a feature extraction method, such as Fourier transform, window Fourier transform, wavelet transform, a least squares method, a boundary direction histogram, texture feature extraction based on Tzmura texture feature, etc., or may be other algorithms, which is not limited in this embodiment.

The step in which the image quality assessment value of the image is determined according to the parameter value of the attribute parameter includes that: the image is divided into at least two image blocks according to a preset partitioning strategy; a parameter value of an attribute parameter of each image block is calculated; the parameter value of the attribute parameter of the image is determined according to the parameter values of the attribute parameter of the at image blocks; an assessment value of the attribute parameter is determined according to the parameter value of the attribute parameter of the image; and the image quality assessment value of the image is determined according to the assessment value of the attribute parameter.

One feasible implementation for determining the parameter values of the attribute parameter of the image blocks is as follows. A geometric center point of each image block is selected, a parameter value of an attribute parameter of the geometric center point of the image block is calculated, and the parameter value of the attribute parameter of the geometric center point of the image block is taken as the parameter value of the attribute parameter of this image block. The parameter value of the attribute parameter of the image is a value range of the same attribute parameter of all image blocks. In an example, a parameter value of saturation of the image is calculated. A geometric center point of each image block is selected, a parameter value of saturation of the geometric center point is calculated, a saturation value of the geometric center point is taken as the parameter value of saturation of the corresponding image block, and then a parameter value of saturation of the image is a value range of the saturation of all image blocks in the image.

The preset partitioning strategy is a default or user-defined strategy for dividing the image into at least two image blocks according to a preset length and width. After the image is divided into at least two image blocks and the parameter values of the attribute parameter of all the image blocks are obtained, the parameter value of the attribute parameter of the image is determined, and the image quality assessment value of each image is calculated according to the parameter value of the attribute parameter of the image. The calculation of the image quality assessment value of each image according to the parameter value of the attribute parameter of the image may be implemented with, but not limited to, a implementation below. An assessment value of the attribute parameter of each image is determined according to a preset mapping relationship between a parameter value of a attribute parameter and an assessment value, and the image quality assessment value of each image is determined according to the assessment value of the attribute parameter.

When the attribute parameter of each image block includes one attribute parameter, such as saturation, a saturation value of the image is determined according to a saturation value of all the image blocks, and an assessment value corresponding to the saturation value of the image is determined as the image quality assessment value of the image. When the attribute parameter of each image block includes multiple attribute parameters, such as saturation and contrast, saturation and contrast of the image are determined according to saturation and contrast of all the image blocks, assessment values corresponding to saturation and contrast are respectively determined according to parameter values of saturation and contrast, and the image quality assessment value is calculated based on the assessment value corresponding to saturation and the assessment value corresponding to contrast in a preset calculation manner. The preset calculation manner may be calculation of an arithmetic mean of the assessment values of attribute parameters, which is not limited in this embodiment.

The parameter value of the attribute parameter of the image may be an interval value. A mapping interval of the parameter value of the attribute parameter of the image is searched out according to the preset mapping relationship between the parameter value of the attribute parameter and the assessment value of the attribute parameter, thereby determining the assessment value of the attribute parameter of the image. The determination of the image quality assessment value is determined by the arithmetic mean of the assessment value of at least one attribute parameter of the image. In an example where saturation and contrast are used, the image quality assessment value of the image is calculated in a manner below. An assessment value of saturation of each image is obtained according a preset mapping relationship between a parameter value of saturation and an assessment value of saturation; an assessment value of contrast of each image is obtained according to a preset mapping relationship between a parameter value of contrast and an assessment value of contrast; an arithmetic mean of each assessment value of saturation and the assessment value of contrast is calculated; and the arithmetic mean is taken as the image quality assessment value of a corresponding image.

In step S1102, when the image quality assessment value is determined to satisfy a preset quality condition, a photograph-capture instruction is generated, the photograph-capture instruction is executed, and the image is saved as a target image.

Before the image quality assessment value is determined to satisfy the preset quality condition, the image quality assessment value of the image is compared with a preset assessment value threshold. When the image quality assessment value of the image is greater than the preset assessment value threshold, it is determined that the image quality assessment value of the image satisfies the preset quality condition.

The assessment value threshold may be set by the system by default, or may be customized by the user at any time during the process of triggering the photograph-capturing. One feasible implementation of presetting the assessment value threshold by the user is to prompt the user through the screen to set a threshold of the image quality assessment value for triggering the automatic photograph-capturing.

When the image quality assessment value of the image fails to satisfy the preset quality condition, the image quality assessment value of the image is adjusted according to the parameter value of the attribute parameter.

When the attribute parameter for determining the image quality assessment value includes one attribute parameter, the parameter value of this attribute parameter may be directly adjusted to enable the image quality assessment value to be greater than the preset assessment value threshold, so as to adjust the image quality of the image and enable the saved target image to be the image satisfying the quality condition.

When the attribute parameter includes at least two attribute parameters of sharpness, sharpness, contrast, satura-tion, luminance and noise, the step in which the image quality assessment value of the image is adjusted according to the parameter value of the attribute parameter includes steps described below.

An assessment value corresponding to a parameter value of each attribute parameter is determined, the attribute parameters are sorted according to the assessment values of the attribute parameters, and a sorting result is obtained; and the parameter value of the attribute parameters are adjusted according to the sorting result to adjust the image quality assessment value of the image.

When the attribute parameter includes at least two attribute parameters, in the course of adjustment, the parameter values of the attribute parameters are adjusted according to the assessment values of the attribute parameters. For example, an attribute parameter having a larger assessment value is adjusted in priority to improve the entire image quality assessment value of the image.

In this embodiment, when the photograph-capturing is performed, whether the quality of the image satisfies the quality condition is determined based on calculation of the image quality assessment value of the image. When the quality of the image satisfies the quality condition, the photograph-capture instruction is generated to save the image. When the quality of the image fails to satisfy the quality condition, the quality of the image is adjusted to ensure that the saved image is the image satisfying the quality condition. Furthermore, when the image quality assessment value of the image is calculated, the image is divided into multiple image blocks to determine the parameter value of the attribute parameter of the image according to parameter values of an attribute parameter of the image blocks, so as to determine the image quality assessment value of the image, thereby accurately calculating the image quality assessment value of the image.

Embodiment 2

An embodiment of the present disclosure provides a photograph-capture method. The photograph-capture method in the embodiment of the present disclosure may be executed by a photograph-capture apparatus, and the photograph-capture apparatus may be disposed in or externally connected to a terminal. The terminal may be a mobile phone, a tablet PC, a digital camera, etc.

Figure 1B:
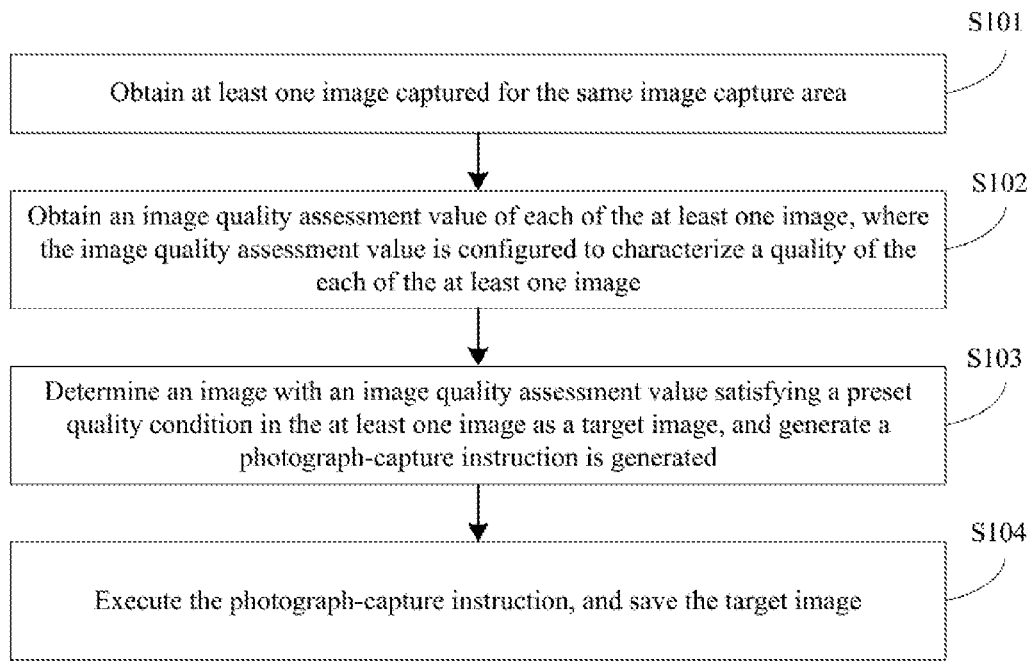
FIG. 1B is a flowchart of a photograph-capture method according to an embodiment 2 of the present disclosure.

FIG. 1B is a flowchart of a photograph-capture method according to an embodiment 2 of the present disclosure. Referring to FIG. 1B, the method includes steps described below.

In step S101, at least one image captured for the same image capture area is obtained.

After the user determines that the photograph-capture apparatus has been directed to the target scene to be photographed, when an automatic photograph-capture mode request is triggered through the voice operation, click operation or touch operation on a physical button or a virtual button of the terminal, the terminal captures at least one image for the same image capture area through an image sensor. The at least one captured image is buffered as candidate images for the target image, and is not used as a finally saved target image. In the embodiment, the image capture area refers to a view area of an image sensor. The number of captured images may be customized by the user or configured by the system by default according to actual demands. Of course, there are other setting manners, which is not limited in this embodiment.

In step S102, an image quality assessment value of each of the at least one image is obtained, where the image quality assessment value is configured to characterize a quality of the each of the at least one image.

The terminal needs to analyze the captured images currently buffered to obtain the image quality assessment value of each image.

In practice, the image quality assessment value of the image may be an arithmetic mean of an assessment value of at least one attribute parameter of the image. The attribute parameter of the image may be obtained using a feature extraction method, such as Fourier transform, window Fourier transform, wavelet transform, a least squares method, a boundary direction histogram, texture feature extraction based on Tzmura texture feature, etc., or may be other algorithms, which is not limited in this embodiment.

In the implementation process, in order to obtain an image quality assessment value of one image, the step in which the image quality assessment value of the each of the at least one image is obtained includes that: a parameter value of at least one attribute parameter of each image is obtained; and an image quality assessment value of the image is calculated according to the parameter value of the at least one attribute parameter of the image in accordance with a preset rule.

The attribute parameter of the at least one image may be sharpness, contrast, saturation, luminance, noise, etc., which is not limited in this embodiment. The parameter value of these attribute parameters may be taken as an assessment index to measure the image quality of the image.

The step in which the image quality assessment value of each image is calculated according to the parameter value of the at least one attribute parameter of the image includes that: the image is divided into at least two image blocks according to a preset partitioning strategy; a parameter value of at least one attribute parameter of each of the at least two image blocks is calculated; the parameter value of the attribute parameter of the image is determined according to the parameter values of the at least one attribute parameter of the at least two image blocks; the assessment value of the attribute parameter is determined according to the parameter value of the attribute parameter of the image; and the image quality assessment value of the image is determined according to the assessment value of the attribute parameter.

One feasible implementation for determining the parameter values of the attribute parameter of the image blocks is as follows. A geometric center point of each image block is selected, a parameter value of an attribute parameter of the geometric center point of the image block is calculated, and the parameter value of the attribute parameter of the geometric center point of the image block is taken as the parameter value of the attribute parameter of this image block. The parameter value of the attribute parameter of the image is a value range of the same attribute parameter of all image blocks. In an example, a parameter value of saturation of the image is calculated. A geometric center point of each image block is selected, a parameter value of saturation of the geometric center point is calculated, a saturation value of the geometric center point is taken as the parameter value of saturation of the corresponding image block, and then a parameter value of saturation of the image is a value range of the saturation of all image blocks in the image.

The preset partitioning strategy is a default or user-defined strategy for dividing the image into at least two image blocks according to a preset length and width. The manner of calculating the image quality assessment value of each image according to the parameter value of at least one attribute parameter in accordance with the preset rule may be, but not limited to, a implementation below. An assessment value of the at least one attribute parameter of each image is determined according to a preset mapping relationship between a parameter value of a attribute parameter and an assessment value, an arithmetic mean of the assessment value of the at least one attribute parameter of the image is calculated, and the arithmetic mean of the image is taken as the image quality assessment value of the corresponding image.

Since the parameter value of the attribute parameter of the image may be an interval value, a mapping interval of the parameter value of the attribute parameter of the image is searched out according to the preset mapping relationship between the parameter value of the attribute parameter and the assessment value of the attribute parameter, thereby determining the assessment value of the attribute parameter of the image. The determination of the image quality assessment value is determined by the arithmetic mean of the assessment values of at least one attribute parameter of the image. In an example where saturation and contrast are used, the image quality assessment value of the image is calculated in a manner below. An assessment value of saturation of each image is obtained according a preset mapping relationship between a parameter value of saturation and an assessment value of saturation; an assessment value of contrast of each image is obtained according to a preset mapping relationship between a parameter value of contrast and an assessment value of contrast; an arithmetic mean of each assessment value of saturation and the assessment value of contrast is calculated; and the arithmetic mean is taken as the image quality assessment value of a corresponding image.

When the obtained attribute parameter includes one attribute parameter, the assessment value of this attribute parameter of the image may be directly taken as the image quality assessment value of the image.

In step S103, an image with an image quality assessment value satisfying a preset quality condition in the at least one image is determine as a target image, and a photograph-capture instruction is generated.

The image quality assessment value of the each of the at least one image is compared with a preset assessment value threshold. The image with an image quality assessment value greater than the preset assessment value threshold is determined as the image satisfying the preset quality condition.

When an image quality assessment value of a currently buffered image in the at least one image is calculated, this image quality assessment value is compared with the preset assessment value threshold. If this image quality assessment value is greater than or equal to the preset assessment value threshold, this image is taken as the target image.

The preset assessment value threshold may be set by the system by default, or may be customized by the user at any time during the process of triggering the photograph-capturing. One feasible implementation of presetting the assessment value threshold by the user is to prompt the user through the screen to set a threshold of the image quality assessment value for triggering the automatic photograph-capturing.

In step S104, the photograph-capture instruction is executed, and the target image is saved.

After the target image is directly saved, the target image may be displayed on the screen of the terminal. Images whose image quality assessment values fail to satisfy the preset quality condition may be deleted.

It is to be noted that the above process may be that the terminal finds a view for the same scene using an image capture module, captures at least one image once and processes all the at least one image, or may be that the terminal finds a view for the same scene using the image capture module, captures one image and processes this image immediately. Such operation is repeated until a number i of images have an image quality satisfying the preset quality condition required by the photograph-capturing, then the automatic photograph-capturing is triggered, where i is a positive integer greater than or equal to 1.

It can be seen that this embodiment captures at least one image for the same image capture area. Each of the at least one image is processed, and an image quality assessment value of the each of the at least one image is obtained, where the image quality assessment value is configured to characterize a quality of the each of the at least one image; the image quality of the at least one image captured for the same capture area is assessed before the automatic photograph-capturing is triggered, the image with an image quality assessment value greater than or equal to the preset assessment value threshold in the at least one image is determined as the target image, and a photograph-capture instruction is generated; and the photograph-capture instruction is executed, the target image is saved, and images with an image quality assessment value less than the preset assessment value threshold in the at least one image are deleted. It can be seen that, if the image quality assessment value of the image is greater than or equal to a threshold for automatically triggering the photograph-capturing, the automatic photograph-capturing is triggered and implemented, thereby avoiding the incapability of capturing the target scene captured in time, and ensuring the quality of the captured photo.

Embodiment 3

Figure 2:
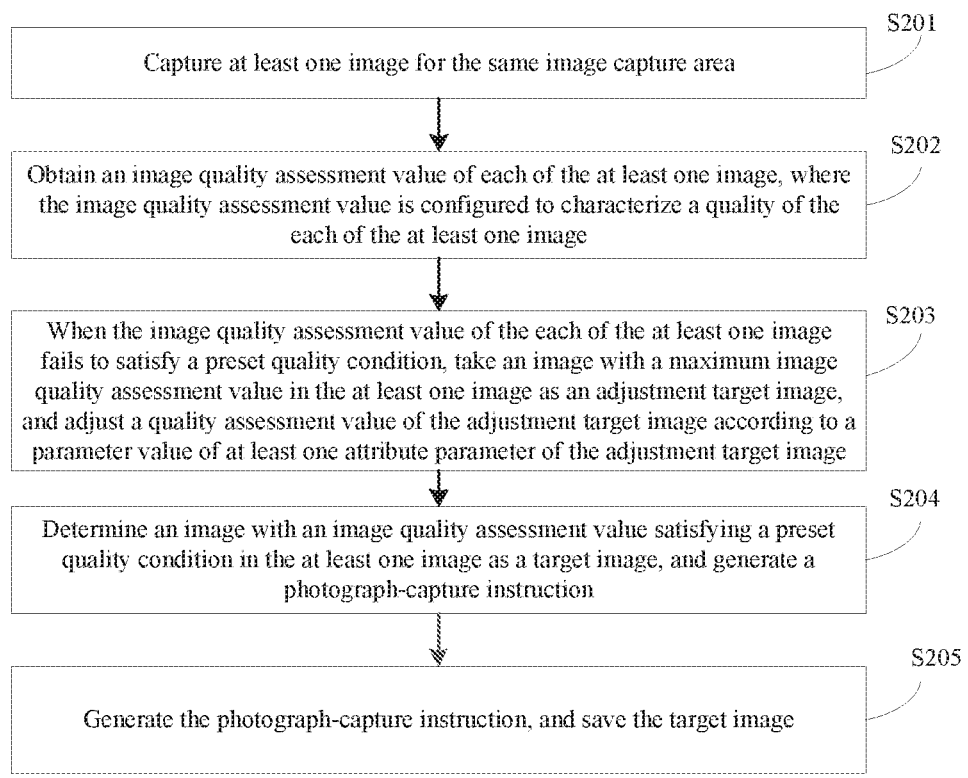
FIG. 2 is a flowchart of a photograph-capture method according to an embodiment 3 of the present disclosure.

An embodiment of the present disclosure provides a photograph-capturing method. As shown in FIG. 2, the case where each of the at least one image fails to satisfy the preset quality condition is described in this embodiment.

In this embodiment, when the image quality assessment value of each of the at least one image is less than the preset assessment value threshold, the adjustment of the parameter value of the attribute parameter of the image may be adjustment of the image quality assessment value of the k-th image in the at least one image, or may be adjustment of the image quality assessment values of n images in the at least one image. This embodiment is described by taking the adjustment of the image quality assessment value of the k-th image in the at least one image as an example.

In step S201, at least one image is captured for the same image capture area.

In step S202, an image quality assessment value of each of the at least one image is obtained, where the image quality assessment value is configured to characterize a quality of the each of the at least one image.

In step S203, when the image quality assessment value of the each of the at least one image fails to satisfy a preset quality condition, an image with a maximum image quality assessment value in the at least one image is taken as an adjustment target image, and a quality assessment value of the adjustment target image is adjusted according to a parameter value of at least one attribute parameter of the adjustment target image.

The adjustment of the quality assessment value may be adjustment of an attribute parameter affecting the image quality, and the adjustment may be implemented through linear correction or nonlinear correction.

In the implementation process, in order to adjust the image quality assessment value of the adjustment target image in the at least one image, the feasible implementation of step S203 may be performed in two manners described below.

In a manner 1, a parameter value of at least one attribute parameter of the adjustment target image is obtained; an assessment value corresponding to the parameter value of each attribute parameter is determined, and an attribute parameter with an assessment value less than a first preset threshold is taken as a first target attribute parameter; and the parameter value of the first target attribute parameter is adjusted until the assessment value of the first target attribute parameter is greater than or equal to the first preset threshold.

The value of the first preset threshold may be the same as or different from the value of the preset assessment value threshold, which is not limited in this embodiment. The adjustment of the parameter value of the first target attribute parameter may be adjustment of the parameter value of each attribute parameter in the first target attribute parameter. For example, the adjustment target image is processed to respectively obtain the parameter value (a, b) of contrast, the parameter value (c, d) of luminance and the parameter value (e, f) of saturation of the adjustment target image. The assessment value of contrast is obtained to be 60 according to a preset mapping relationship between a parameter value of contrast and the assessment value of contrast. The assessment value of luminance is obtained to be 70 according to a preset mapping relationship between a parameter value of luminance and the assessment value of luminance. The assessment value of luminance is obtained to be 80 according to a preset mapping relationship between a parameter value of saturation and the assessment value of saturation. Since assessment values of contrast and luminance are less than the first preset threshold equaling to 75, the parameter values of contrast and luminance are respectively adjusted until the assessment values of contrast and luminance both are greater than or equal to 75.

In a manner 2, the parameter value of the at least one attribute parameter of the adjustment target image is obtained; an assessment value corresponding to the parameter value of each attribute parameter is determined, and attribute parameters with an assessment value less than a second preset threshold are taken as second target attribute parameters; the second target attribute parameters are sorted according to the assessment values; and the parameter values of the sorted second target attribute parameters are adjusted sequentially until the image quality assessment value of the adjustment target image is greater than or equal to the preset assessment value threshold.

The first preset threshold may be or may not be equal to the second preset threshold.

The second target attribute parameters are sorted according to the assessment value, and for example, may be sorted in an ascending order of the assessment value, which is not limited in this embodiment. When the second preset threshold is set to be greater than a maximum assessment value of all attribute parameters, the second target attribute parameters include all attribute parameters. The assessment values of all attribute parameters are sorted.

The step in which the parameter values of the sorted second target attribute parameters are adjusted sequentially may be implemented with, but not limited to, a implementation described below. A first attribute parameter in the second target attribute parameters is adjusted, the image quality assessment value of the adjusted adjustment target image is calculated. If the image quality assessment value of the adjusted adjustment target image is greater than or equal to the preset assessment value threshold, the adjustment target image is saved; and if the image quality assessment value of the adjusted adjustment target image is less than the preset assessment value threshold, the second attribute parameter is adjusted until the image quality assessment value of the k-th image is greater than the preset assessment value threshold. For example, the adjustment target image is processed to respectively obtain the parameter value (a, b) of contrast, the parameter value (c, d) of luminance and the parameter value (e, f) of saturation of the adjustment target image. The assessment value of contrast is obtained to be 60 according to the preset mapping relationship between a parameter value of contrast and the assessment value of contrast. The assessment value of luminance is obtained to be 70 according to a preset mapping relationship between a parameter value of luminance and the assessment value of luminance. The assessment value of saturation is obtained and is 80 according to a preset mapping relationship between a parameter value of saturation and the assessment value of saturation. Since assessment values of contrast and luminance are less than the second preset threshold equaling to 75, the parameter value of contrast is adjusted in priority because the assessment value of contrast is greater than the assessment value of luminance until the assessment value of contrast is equal to 75, and whether the arithmetic mean of the assessment values of contrast, luminance and saturation is greater than or equal to the preset assessment value threshold of 75 is determined. The adjusted arithmetic mean is equal to the preset assessment value threshold, so the parameter value of luminance is not adjusted.

In step S204, an image with an image quality assessment value satisfying a preset quality condition in the at least one image is determine as a target image, and a photograph-capture instruction is generated.

The image satisfying the preset quality condition is the adjusted adjustment target image.

In step S205, the photograph-capture instruction is executed, and the target image is saved.

In this embodiment, the terminal adjusts the attribute parameter of a currently previewed image so that the image quality assessment value of the currently previewed image satisfies the preset quality condition, and the adjusted currently previewed image is saved, thereby implementing the automatic photograph-capturing and ensuring the quality of the captured photo.

Embodiment 4

Figure 3:
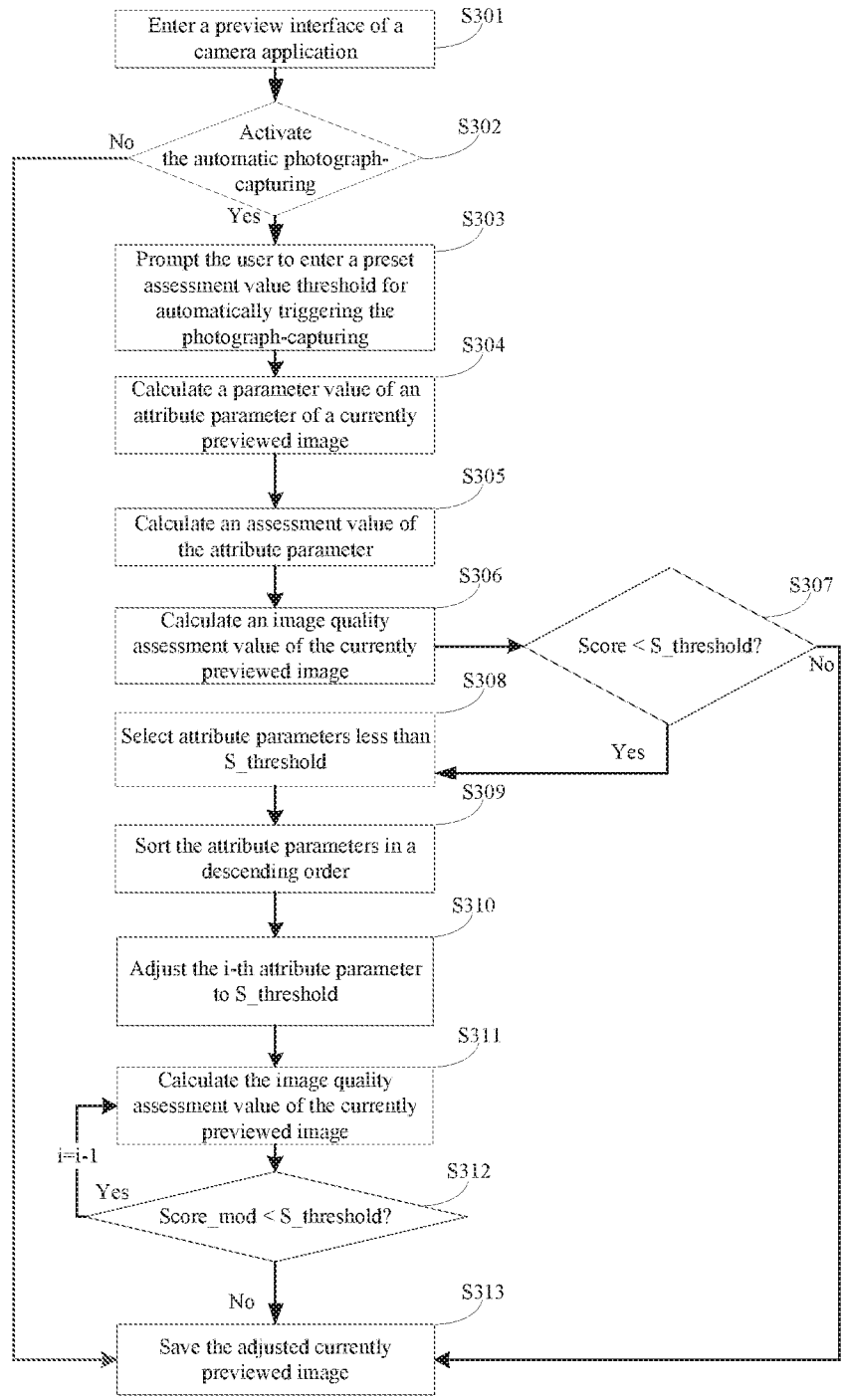
FIG. 3 is a flowchart of a photograph-capture method according to an embodiment 4 of the present disclosure.

An embodiment of the present disclosure provides a photograph-capture method. As shown in FIG. 3, the implementation process of this embodiment is described in detail.

In step S301, a preview interface of a camera application is entered.

In step S302, the user is prompted whether to activate the automatic photograph-capture function.

In step S303, if the user chooses to activate the automatic photograph-capture function, the user is prompted to enter a preset assessment value threshold for automatically triggering the photograph-capturing.

If the user does not enter the above-mentioned threshold, a default threshold is used. At this moment, it is assumed that the threshold for triggering the automatic photograph-capturing is 90.

In step S304, a parameter value of an attribute parameter of the currently previewed image is calculated.

The image quality analysis includes following aspects: (1) saturation analysis; (2) noise analysis; (3) sharpness analysis; (4) contrast analysis; and (5) luminance analysis. Of course, other parameters may be analyzed, which is not limited in this embodiment.

Figure 4:
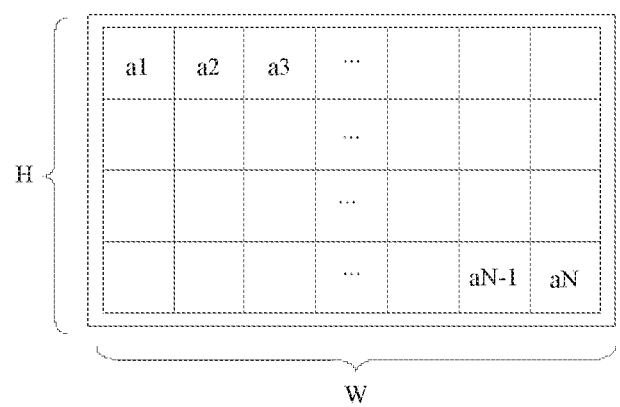
FIG. 4 is a flowchart of a saturation analysis method according to the embodiment 4 of the present disclosure.

Detailed description is provided below with reference to an example of saturation analysis. Referring to FIG. 4, it is assumed that the width and height of the currently previewed image are denoted as W and H respectively. The previewed image is divided into N blocks, i.e., blocks a1, a2, ..., and a(N−1), where N is an integer greater than or equal to 1.

First, a center point of the i-th block in the N blocks is selected, and the saturation Si of the center point of the i-th block is obtained according to a saturation calculation formula (1).

$$S = (\text{Max } V - \text{Min } V)/\text{Max } V \quad (1)$$

S is the saturation of a block center point, a maximum brightness value of the block center point is MaxV=max(R, G, B), and a minimum brightness value of the block center point is MinV=min(R, G, B). R is a value of a red channel of the block center point, G is a value of a green channel of the block center point, and B is a value of a blue channel of the block center point.

Second, S1, S2, ..., and SN are sequentially calculated.

Third, a value range of the saturation of the currently previewed image is obtained to be (Smin, Smax) according to formulas (2) and (3).

$$S\min = \min(S1, S2, \ldots, SN) \quad (2)$$

$$S\max = \max(S1, S2, \ldots, SN) \quad (3)$$

Fourth, the value range (Smin, Smax) of the saturation is taken as the parameter value of saturation.

Similarly, referring to the above method, the terminal may also obtain the parameter value of noise, sharpness, contrast and luminance In step S305, an assessment value of the attribute parameter of the currently previewed image is calculated.

The following description takes the assessment value of saturation of currently previewed image as an example.

The assessment value S_saturation of the parameter value (Smin, Smax) of saturation obtained in step S304 is obtained according to a preset mapping relationship between a parameter value of saturation and an assessment value of saturation. For example, it is assumed that the parameter value (Smin, Smax) is 85% to 95%, the assessment value of saturation may be obtained to be 95 according to the above mapping relationship.

Similarly, referring to the above method, the terminal may also obtain the assessment value of contrast S_contrast, the assessment value of luminance S_luminance, the assessment value of the sharpness S_sharpness, and the assessment value of the noise S_noise of the currently previewed image according to the preset mapping relationship between the parameter value of the attribute parameter and the assessment value of the attribute parameter.

In step S306, an image quality assessment value Score of the currently previewed image is calculated according to S_saturation, S_contrast, S_luminance, S_sharpness and S_noise.

The terminal may calculate the image quality assessment value of the currently previewed image according to a following formula (4).

$$Score=(S\_saturation+S\_noise+S\_sharpness+S\_contrast+S\_luminance)/5 \quad (4)$$

In step S307, Score and S_threshold are compared. When Score is greater than or equal to S_threshold, the process goes to step S312; and when Score is less than S_threshold, the process goes to step S308.

S_threshold is a threshold for triggering the photograph-capturing.

In step S308, one or more attribute parameters less than S_threshold are selected from S_saturation, S_contrast, S_luminance, S_sharpness and S_noise.

In step S309, the attribute parameters less than S_threshold are sorted in a descending order.

In step S310, the i-th attribute parameter is adjusted to S_threshold, and the process goes to step S311.

An initial value of i is 5.

In step S311, the image quality assessment value Score_mod of the currently previewed image is calculated based on the parameter value of the adjusted attribute parameters. If Score_mod is greater than or equal to S_threshold, the process goes to step S312. If Score_mod is less than S_threshold, i=i−1 and the process goes to step S310.

In step S312, the adjusted currently previewed image is saved.

Embodiment 5

Based on the same disclosure concept, an embodiment of the present disclosure provides a photograph-capture apparatus. The photograph-capture apparatus may be applied to the terminal in one or more embodiments described above.

Figure 5:
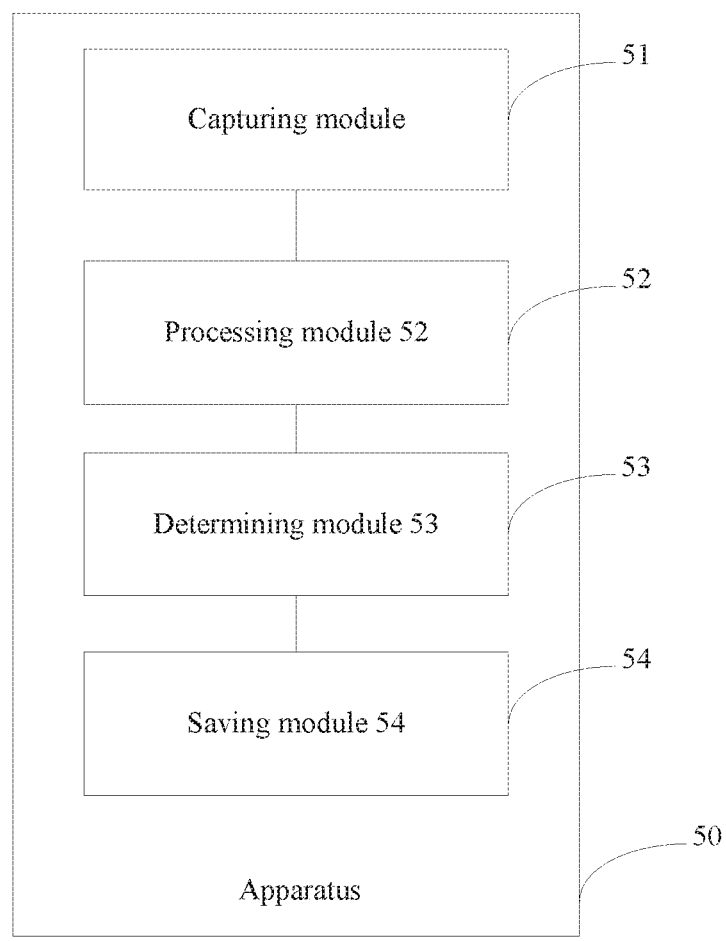
FIG. 5 is a structural diagram of a photograph-capture apparatus according to an embodiment 5 of the present disclosure.

FIG. 5 is a structural diagram of a photograph-capture apparatus according to an embodiment of the present disclosure. As shown in FIG. 5, the photograph-capture apparatus 50 includes a capturing module 51, a processing module 52, a determining module 53 and a saving module. The capturing module 51 is configured to obtain at least one image captured for the same image capture area. The processing module 52 is configured to obtain an image quality assessment value of each of the at least one image. The image quality assessment value is configured to characterize a quality of the each of the at least one image. The determining module 53 is configured to determine an image with an image quality assessment value satisfying a preset quality condition in the at least one image as a target image, and generate a photograph-capture instruction. The saving module 54 is configured to execute the photograph-capture instruction, and save the target image.

In another embodiment of the present disclosure, the processing module 52 obtains the image quality assessment value of the each of the at least one image in a manner of: obtaining a parameter value of at least one attribute parameter of the each of the at least one image; and calculating the image quality assessment value of the each of the at least one image according to the parameter value of the at least one attribute parameter of the each of the at least one image in accordance with a preset rule.

In another embodiment of the present disclosure, the processing module 52 calculates the image quality assessment value of the each of the at least one image according to the parameter value of the at least one attribute parameter of the each of the at least one image in a manner of: dividing the each of the at least one image into at least two image blocks according to a preset partitioning strategy; calculating a parameter value of at least one attribute parameter of each of the at least two image blocks; determining the parameter value of the attribute parameter of the at least two image blocks according to the parameter value of the at least one attribute parameter of the each of the at least two image blocks; determining the assessment value of the attribute parameter according to the parameter value of the attribute parameter of the at least one image; and determining the image quality assessment value of the at least one image according to the assessment value of the attribute parameter.

Figure 6:
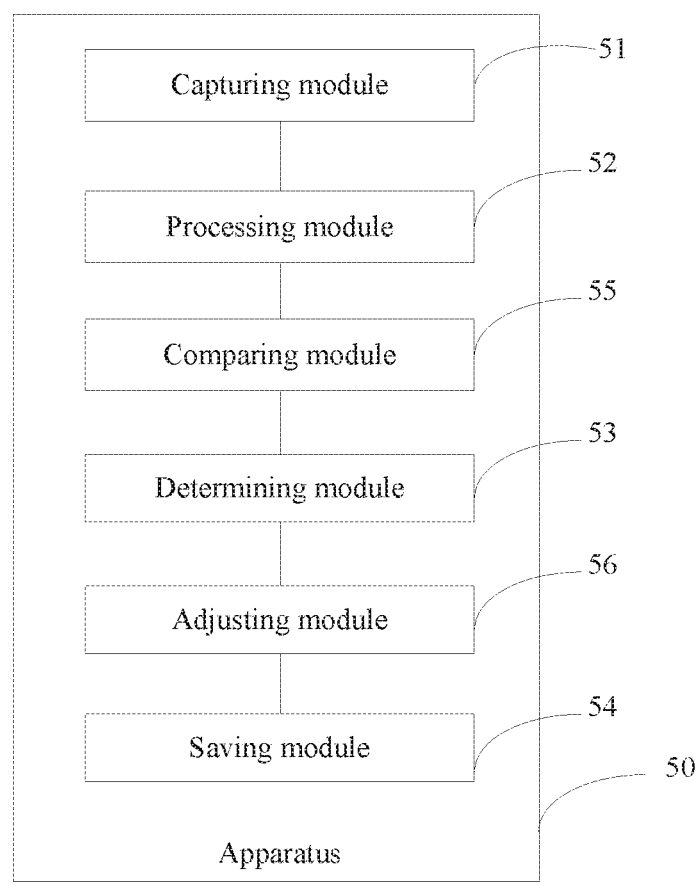
FIG. 6 is another structural diagram of a photograph-capture apparatus according to the embodiment 5 of the present disclosure.

In another embodiment of the present disclosure, as shown in FIG. 6, the photograph-capture apparatus 50 further includes a comparing module 55. The comparing module 55 is configured to compare the image quality assessment value of the each of the at least one image with a preset assessment value threshold; and determine an image with an image quality assessment value greater than the preset assessment value threshold as an image satisfying the preset quality condition.

In another embodiment of the present disclosure, as shown in FIG. 6, the photograph-capture apparatus further includes an adjusting module 56. The adjusting module is configured to, when the image quality assessment value of the each of the at least one image fails to satisfy the preset quality condition, take an image with a maximum image quality assessment value in the at least one image as an adjustment target image; and adjust a quality assessment value of the adjustment target image according to a parameter value of at least one attribute parameter of the adjustment target image.

In practical applications, the capturing module, the processing module, the determining module, the saving module, the comparing module and the adjusting module may all be implemented by a central processing unit (CPU), a micro processor unit (MPU), a digital signal processor (DSP), or a field-programmable gate array (FPGA) located in the photograph-capture apparatus, which is not limited in this embodiment of the present disclosure.

It is to be noted that the above description of the apparatus embodiments is similar to that of the method embodiments and has the same beneficial effects as the method embodiments, which will not be repeated herein. The technical details not disclosed in the apparatus embodiments of the present disclosure may be understood by those skilled in the art with reference to the description of the method embodiments of the present disclosure. In order to reduce the length of the present disclosure, repetition will not be made herein.

Embodiment 6

Based on the same disclosure concept, an embodiment of the present disclosure provides a terminal, which is the same as the terminal in one or more embodiments described above.

Figure 7:
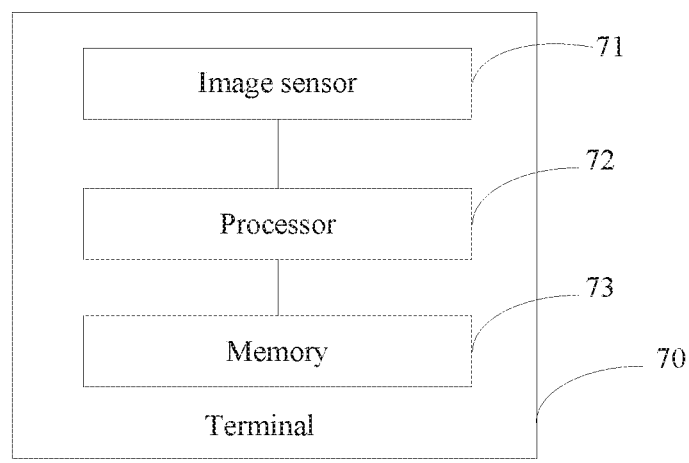
FIG. 7 is a structural diagram of a terminal according to an embodiment 6 of the present disclosure.

As shown in FIG. 7, the terminal 70 includes an image sensor 71, a processor 72 and a memory 73. The image sensor 71 is configured to obtain at least one image captured for the same image capture area. The processor 72 is configured to obtain an image quality assessment value of each of the at least one image, where the image quality assessment value is configured to characterize a quality of the each of the at least one image; determine an image with an image quality assessment value satisfying a preset quality condition in the at least one image as a target image, and generate a photograph-capture instruction; and execute the photograph-capture instruction, and save the target image in the memory 73.

The processor may be implemented by a CPU, an MCU, a DSP, an FPGA or the like, which is not limited in this embodiment of the present disclosure.

Embodiment 7

Based on the same disclosure concept, an embodiment of the present disclosure provides a storage medium. In this embodiment, the storage medium may be configured to store program codes for executing steps described below.

In step S1, an image for an image capture area is obtained, and an image quality assessment value of the image is obtained. The image quality assessment value is configured to characterize a quality of the image.

In step S2, when the image quality assessment value is determined to satisfy a preset quality condition, a photograph-capture instruction is generated, the photograph-capture instruction is executed, and the image is saved as a target image.

In an embodiment, the storage medium is further configured to store program codes for executing the step described below.

In step S1, at least one image captured for the same image capture area is obtained.

In step S2, an image quality assessment value of each of the at least one image is obtained. The image quality assessment value is configured to characterize a quality of the each of the at least one image.

In step S3, an image with an image quality assessment value satisfying a preset quality condition in the at least one image is determine as a target image, and a photograph-capture instruction is generated.

In step S4, the photograph-capture instruction is executed, and the target image is saved.

It is to be noted that the above description of the terminal embodiments is similar to that of the method embodiments and has the same beneficial effects as the method embodiments, which will not be repeated herein. The technical details not disclosed in the terminal embodiments of the present disclosure may be understood by those skilled in the art with reference to the description of the method embodiments of the present disclosure. In order to reduce the length of the present disclosure, repetition will not be made herein.

It should be understood by those skilled in the art that the embodiments of the present disclosure may be provided as methods, systems or computer program products. Therefore, the present disclosure may be implemented by hardware, software, or a combination of hardware and software. In addition, the present disclosure may take the form of a computer program product implemented in one or more computer-usable storage media (including, but not limited to, a disk memory and an optical memory) that includes computer-usable program codes.

The present disclosure is described with reference to flowcharts and/or block diagrams of methods, apparatuses (systems) and computer program products according to the embodiments of the present disclosure. It should be understood that each flow and/or block in the flowcharts and/or block diagrams and a combination of flows and/or blocks in the flowcharts and/or block diagrams are implemented by computer program instructions. These computer program instructions can be provided to a general-purpose computer, a special-purpose computer, an embedded processor or a processor of another programmable data processing apparatus to produce a machine so that instructions executed by a computer or the processor of another programmable data processing apparatus produce a means for implementing functions specified in one or more flows in the flowcharts and/or one or more blocks in the block diagrams.

These computer program instructions can also be stored in a computer-readable memory which can direct the computer or another programmable data processing apparatus to operate in a particular manner so that the instructions stored in the computer-readable memory produce a manufactured product including an instruction means. The instruction means implements the functions specified in one or more flows in the flowcharts and/or one or more blocks in the block diagrams.

These computer program instructions can also be loaded onto the computer or another programmable data processing apparatus so that a series of operation steps are performed on the computer or another programmable apparatus to produce processing implemented by the computer. Therefore, instructions executed on the computer or another programmable apparatus provide steps for implementing the functions specified in one or more flows in the flowcharts and/or one or more blocks in the block diagrams.

The above are only preferred embodiments of the present disclosure and are not intended to limit the scope of the present disclosure.

INDUSTRIAL APPLICABILITY

The present disclosure obtains an image for an image capture area, and obtains an image quality assessment value of the image, where the image quality assessment value is configured to characterize a quality of the image; and when the image quality assessment value is determined to satisfy a preset quality condition, generates a photograph-capture instruction, executes the photograph-capture instruction, and saves the image as a target image. Therefore, an image with an image quality assessment value satisfying the preset quality condition is taken as a result of the photograph-capturing, and in another aspect, when the image for the image capture area is multiple images, an image with an image quality assessment value satisfying the preset quality condition is taken as the result of the photograph-capturing, thereby implementing the effective capture of the target scene and ensuring the quality of the image captured by the terminal.

What is claimed is:
1. A photograph-capture method, comprising:
obtaining an image for an image capture area, and obtaining an image quality assessment value of the image, wherein the image quality assessment value is configured to characterize a quality of the image; and
in response to determining that the image quality assessment value satisfies a preset quality condition, generating a photograph-capture instruction, executing the photograph-capture instruction, and saving the image as a target image;
wherein obtaining the image quality assessment value of the image comprises:
obtaining a parameter value of an attribute parameter of the image, and determining the image quality assessment value of the image according to the parameter value of the attribute parameter;
wherein the attribute parameter comprises at least one attribute parameter of a group consisting of: sharpness, contrast, saturation, luminance and noise;

wherein determining the image quality assessment value of the image according to the parameter value of the attribute parameter comprises:
dividing the image into at least two image blocks according to a preset partitioning strategy;
calculating a parameter value of an attribute parameter of each of the at least two image blocks;
determining the parameter value of the attribute parameter of the image according to the parameter values of the attribute parameter of the at least two image blocks; and
determining an assessment value of the attribute parameter according to the parameter value of the attribute parameter of the image, and determining the image quality assessment value of the image according to the assessment value of the attribute parameter.

2. The method of claim 1, further comprising:
comparing the image quality assessment value of the image with a preset assessment value threshold; and
in response to determining that the image quality assessment value of the image is greater than the preset assessment value threshold, determining that the image quality assessment value of the image satisfies the preset quality condition.

3. The method of claim 1, further comprising:
in response to determining that the image quality assessment value of the image fails to satisfy the preset quality condition, adjusting the image quality assessment value of the image according to the parameter value of the attribute parameter.

4. The method of claim 3, wherein when the attribute parameter comprises at least two attribute parameters of a group consisting of: sharpness, sharpness, contrast, saturation, luminance and noise, adjusting the image quality assessment value of the image according to the parameter value of the attribute parameter comprises:
determining an assessment value corresponding to a parameter value of each of the at least two attribute parameters, sorting the at least two attribute parameters according to the assessment value, and obtaining a sorting result; and
adjusting the parameter value of the each of the at least two attribute parameters according to the sorting result to adjust the image quality assessment value of the image.

5. A photograph-capture apparatus, comprising:
a processor; and
a memory for storing instructions executable by the processor,
wherein the processor is configured to implement the method of claim 1.

6. The apparatus of claim 5, wherein the processor is further configured to, in response to determining that the image quality assessment value of the each of the at least one image fails to satisfy the preset quality condition, sort the at least one image according to the image quality assessment value, and take an image with a maximum image quality assessment value in the at least one image as an adjustment target image; and adjust a quality assessment value of the adjustment target image according to a parameter value of at least one attribute parameter of the adjustment target image.

7. A storage medium, comprising stored programs, wherein, when executed, the programs execute the method of claim 1.

8. A photograph-capture method, comprising:
obtaining at least one image captured for one capture area;
obtaining an image quality assessment value of each of the at least one image, wherein the image quality assessment value is configured to characterize a quality of the each of the at least one image;
determining an image with an image quality assessment value satisfying a preset quality condition in the at least one image as a target image, and generating a photograph-capture instruction; and
executing the photograph-capture instruction, and saving the target image;
wherein obtaining the image quality assessment value of the each of the at least one image comprises:
obtaining a parameter value of at least one attribute parameter of the each of the at least one image; and
calculating an image quality assessment value of the each of the at least one image according to the parameter value of the at least one attribute parameter of the each of the at least one image in accordance with a preset rule;
wherein calculating the image quality assessment value of the each of the at least one image according to the parameter value of the at least one attribute parameter of the each of the at least one image comprises:
dividing the each of the at least one image into at least two image blocks according to a preset partitioning strategy;
calculating a parameter value of at least one attribute parameter of each of the at least two image blocks;
determining the parameter value of the attribute parameter of the each of the at least one image according to the parameter values of the at least one attribute parameter of the at least two image blocks; and
determining the assessment value of the attribute parameter according to the parameter value of the attribute parameter of the at least one image, and determining the image quality assessment value of each of the at least one image according to the assessment value of the attribute parameter.

9. The method of claim 8, further comprising:
comparing the image quality assessment value of the each of the at least one image with a preset assessment value threshold; and
determining an image with an image quality assessment value greater than the preset assessment value threshold as an image satisfying the preset quality condition.

10. The method of claim 7, further comprising:
in response to determining that the image quality assessment value of the each of the at least one image fails to satisfy the preset quality condition, taking an image with a maximum image quality assessment value in the at least one image as an adjustment target image; and
adjusting a quality assessment value of the adjustment target image according to a parameter value of at least one attribute parameter of the adjustment target image.

11. The method of claim 10, wherein adjusting the quality assessment value of the adjustment target image according to the parameter value of the at least one attribute parameter of the adjustment target image comprises:
obtaining the parameter value of the at least one attribute parameter of the adjustment target image;
determining an assessment value corresponding to each of the parameter values of the at least one attribute parameter, and taking an attribute parameter with an assessment value less than an attribute parameter of a first preset threshold as a first target attribute parameter; and adjusting a parameter value of the first target attribute parameter until the assessment value of the first target attribute parameter is greater than or equal to the first preset threshold.

12. The method of claim 10, wherein adjusting the quality assessment value of the adjustment target image comprises:
obtaining the parameter value of the at least one attribute parameter of the adjustment target image;
determining an assessment value corresponding to each of the parameter value of the at least one attribute parameter, and taking a plurality of attribute parameters with assessment values less than a second preset threshold as second target attribute parameters;
sorting the second target attribute parameters according to the assessment value; and
adjusting the parameter values of the sorted second target attribute parameters sequentially until the image quality assessment value of the adjustment target image is greater than or equal to the preset assessment value threshold.

13. The method of claim 8, wherein the attribute parameter comprises: sharpness, contrast, saturation, luminance and noise.

14. A terminal, comprising: an image sensor, a processor and a memory; wherein
the image sensor is configured to obtain at least one image captured for one image capture area; and
the processor is configured to obtain an image quality assessment value of each of the at least one image, wherein the image quality assessment value is configured to characterize a quality of the each of the at least one image; determine an image with an image quality assessment value satisfying a preset quality condition in the at least one image as a target image, and generate a photograph-capture instruction; and execute the photograph-capture instruction, and save the target image in the memory;
wherein the image sensor is configured to obtain the image quality assessment value of the each of the at least one image by:
obtaining a parameter value of at least one attribute parameter of the each of the at least one image; and
calculating an image quality assessment value of the each of the at least one image according to the parameter value of the at least one attribute parameter of the each of the at least one image in accordance with a preset rule;
wherein calculating the image quality assessment value of the each of the at least one image according to the parameter value of the at least one attribute parameter of the each of the at least one image comprises:
dividing the each of the at least one image into at least two image blocks according to a preset partitioning strategy;
calculating a parameter value of at least one attribute parameter of each of the at least two image blocks;
determining the parameter value of the attribute parameter of the each of the at least one image according to the parameter values of the at least one attribute parameter of the at least two image blocks; and
determining the assessment value of the attribute parameter according to the parameter value of the attribute parameter of the at least one image, and determining the image quality assessment value of each of the at least one image according to the assessment value of the attribute parameter.

* * * * *